Figure 1:
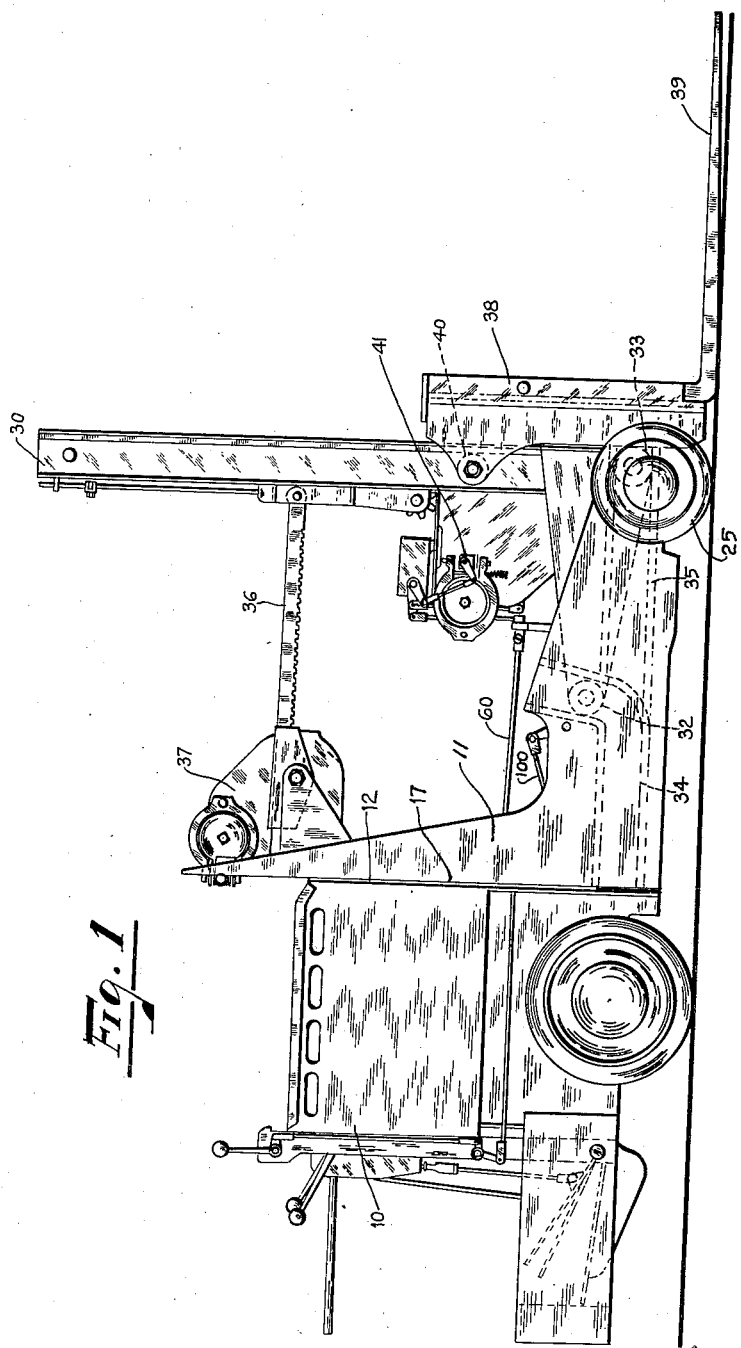

Sept. 12, 1939.  C. S. SCHROEDER  2,173,068
LIFTING TRUCK
Original Filed June 7, 1935  4 Sheets-Sheet 1

Sept. 12, 1939. C. S. SCHROEDER 2,173,068
LIFTING TRUCK
Original Filed June 7, 1935 4 Sheets-Sheet 2

Inventor
C. S. Schroeder
By A. H. Golden
Attorney

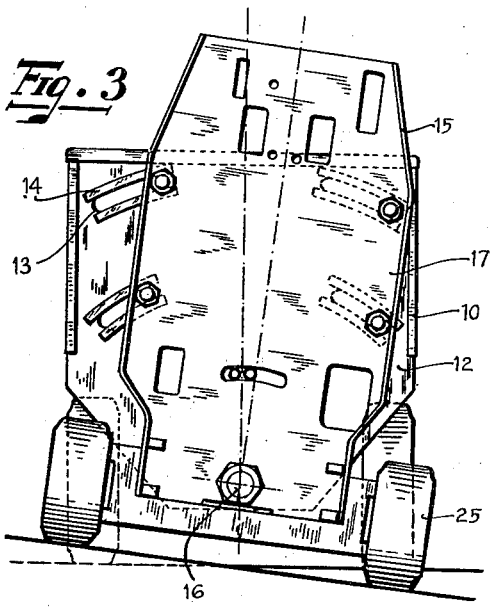
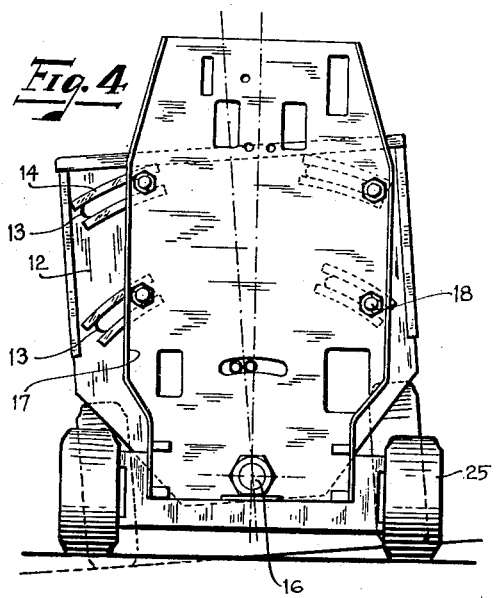
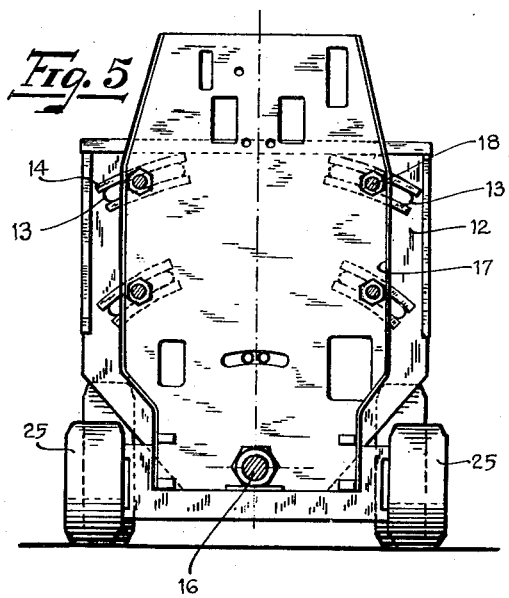
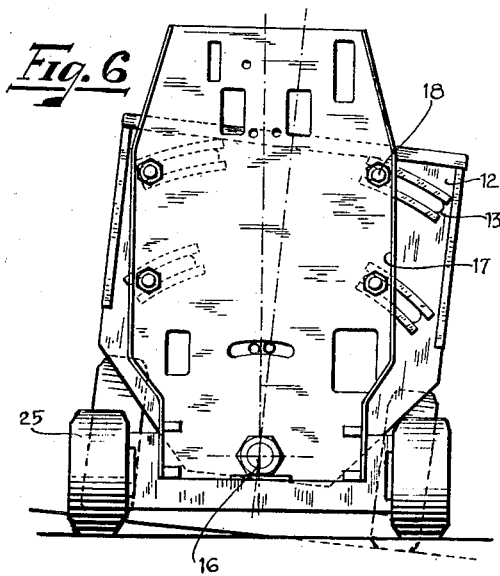

Sept. 12, 1939.　　　C. S. SCHROEDER　　　2,173,068
LIFTING TRUCK
Original Filed June 7, 1935　　4 Sheets-Sheet 4
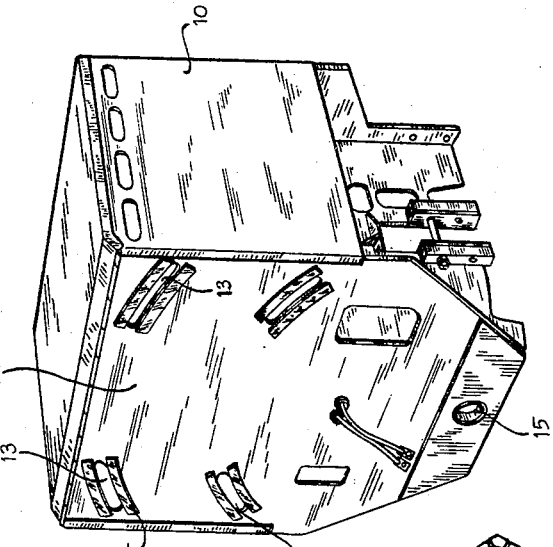
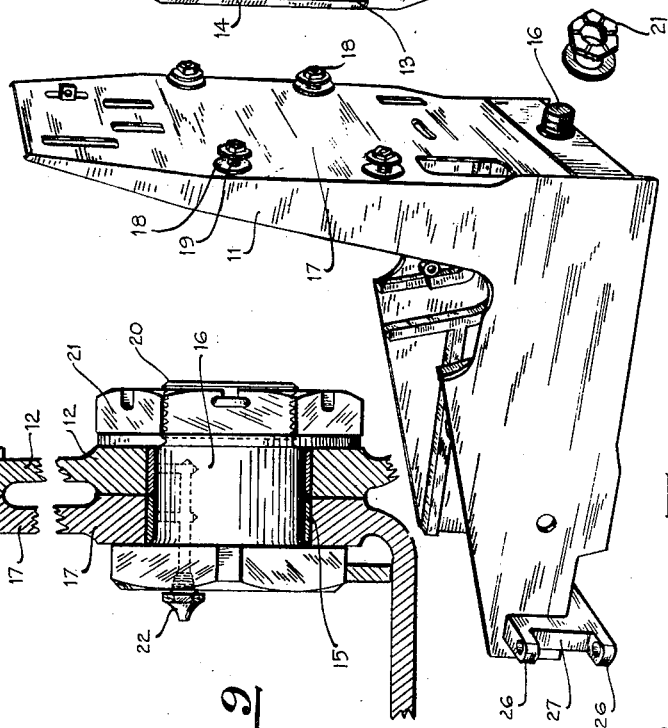
Inventor
C. S. Schroeder
By A. H. Golden
Attorney Patented Sept. 12, 1939

2,173,068

UNITED STATES PATENT OFFICE 2,173,068

LIFTING TRUCK

Charles S. Schroeder, Philadelphia, Pa., assignor to The Yale & Towne Manufacturing Company, Stamford, Conn., a corporation of Connecticut Original application June 7, 1935, Serial No. 25,437. Divided and this application December 11, 1936, Serial No. 115,282

4 Claims. (Cl. 280—111)

This invention relates to industrial trucks of the type utilized for carrying heavy industrial loads.

An industrial truck of the type adapted to carry extremely heavy loads must be designed so that in moving over relatively rough terrain or rough floors, the load supporting wheels will remain continuously in contact with the floor or terrain despite the variations in the same. It is also of importance in a truck of this type to maintain the load stable and against tilting, especially where the load is necessarily elevated to a particularly high position or has a high center of gravity. It is also necessary in a truck of this type to maintain the tractive wheels in proper relation to the terrain so as to obtain all the traction necessary. It is also advantageous to so design the truck that in carrying the heavy loads, the weight will be so distributed as to eliminate torsional stresses in the frame.

It is naturally possible to obtain the greatest stability of the load by simply having the truck supported by wheels solidly secured to the load carrying portion and to the rear or driving portion of the truck. It will be helpful if at this point it is explained that the rear or driving portion of an industrial truck is usually the part having the battery compartment, the operator's platform and the driving wheels. The forward portion of the truck is referred to as the load carrying portion, and in a fork truck, the forks normally overhang the forward portion. Naturally, in a truck in which the wheels are solid with the load carrying and driving portions, great torsional stresses will be set up in the frame where the terrain is rough, since certain of the wheels will be lifted entirely from the terrain should it be sufficiently rough, and three wheels will determine the plane of support. For this reason, the tractive effort of the driving wheels will also be interfered with under the same conditions.

As distinguished from the type of truck described in the preceding paragraph, we can visualize a truck in which the wheels carrying the load supporting portion are articulated relatively to the load supporting portion so that the wheels may follow the terrain most accurately, and we can further visualize the rear or driving wheels similarly placed on the truck. It will be readily appreciated that in a truck of this type, we will have the maximum possible tractive effort, and we will also have a minimum of stress set up in the frame. However, this type of truck will have absolutely no load stability and cannot be utilized. It is in between the two diametrically opposite constructions just described that we find present day commercial industrial trucks, and therefore we naturally find a compromise construction.

In order to obtain substantial stability while eliminating frame stress, and in order to obtain the proper tractive effort, industrial trucks now generally utilize articulating load supporting wheels and/or articulating load supporting axles. The rear driving mechanism is generally supported by means of springs which contribute the necessary stability to the truck. More conservative types of construction, where stability is exceedingly important, utilize supporting wheels mounted on beam members which articulate only on a transverse axis relatively to the truck. Naturally, even such trucks, when loaded, do not have as high a load stability as is desirable.

I believe that I have invented an industrial truck which embodies an extreme departure from the teachings of the prior art, whereby I obtain a truck in which the construction is not a compromise along the lines discussed above. I utilize a load supporting portion supported by wheels mounted solidly on this load supporting portion. I then utilize a driving portion which I connect to this load supporting portion by means permitting a sliding, and preferably an articulating, pivoting movement of the load supporting portion relatively to said driving portion. In this way, my load wheels follow the terrain quite well while at the same time contributing maximum load stability.

My truck should not be confused with tractor trucks in which a complete truck unit having front and rear wheels supports at one end a two wheeled or four wheeled trailer. While my truck is formed of two units, those two units cooperate to form a single truck, rather than a truck and trailer.

Preferably, the means which I utilize for obtaining this sliding and articulating movement comprise a pivot shaft connecting the load supporting portion to the driving portion, and about which pivot the two portions rotate relatively to one another. Preferably, also, the two portions of the truck terminate in vertical plates which form the sliding or rotating surfaces, there being bolt and slot members for limiting the movement between these two plates to a predetermined degree. Naturally, these pivots, bolts, and slots might conceivably be utilized without the presence of the main pivoting shaft, but I believe that my particular construction is better.

It will be especially interesting to note that I find that the location of this pivot shaft should be at a very low point and preferably almost in the same plane as the axis of rotation of the load supporting wheels.

It will also be interesting to note that with the pivot shaft located at this lowest possible point, when the truck is loaded, there will be a tendency to separate the truck portions at their upper point, thus tending to bend the pivot shaft. This bending action is, of course, resisted by a plurality of bolts and slot members connecting the two vertical plates.

The particular construction indicated is especially useful in connection with a truck of the tilting fork type. It is a tilting fork type of truck, therefore, which is shown in this application. The novel features of the tilting fork construction per se are shown and are claimed in my application for a Lifting truck filed June 7, 1935, Serial No. 25,437, of which this application is a division.

Having thus generally described the purposes for which my invention is especially adapted, and having now also described the general features of the invention, I shall proceed with a detailed description of the mechanism I prefer to utilize. I believe, however, that I have made a substantial contribution to the industrial truck art, which contribution should not be limited except as may be required by the state of the art.

Figure 2:
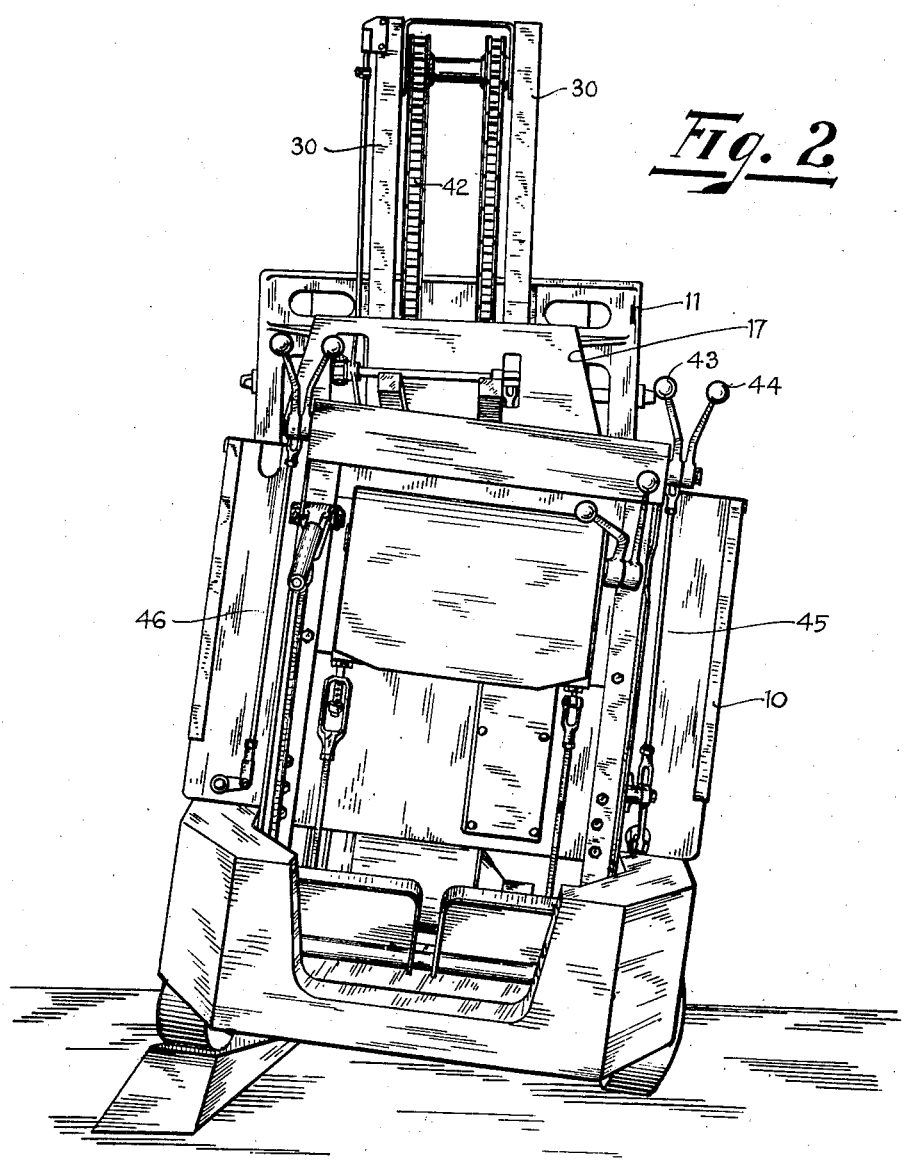

Referring now to the drawings, Fig. 1 illustrates a truck embodying my invention, the truck shown being of the type having tilting uprights. Fig. 2 shows the truck of Fig. 1 viewed from its rear end and with its rear or driving portion tilted relatively to its front or load supporting portion. Figs. 3–6, inclusive, show the construction of the means whereby it is possible to articulate the load supporting portion relatively to the rear or driving portion. Fig. 7 is a perspective view of the frame of the load supporting portion, while Fig. 8 is a perspective view of the rear or driving portion of the frame. Fig. 9 is a section taken through the truck to illustrate the mounting of the pivot shaft about which the two portions pivot. Fig. 10 is a section showing a bolt connecting the vertical plates of the load supporting and driving portions.

Referring now more particularly to the drawings, and especially to Figs. 1, 2, 7 and 8, reference numeral 10 indicates the rear portion of the truck while reference numeral 11 indicates the forward or load supporting portion of the truck. The portion 10 carries the usual battery and mechanism for driving the wheels, all this being quite unnecessary to indicate in detail. It should be noted, however that the rear portion 10 terminates in a vertical plate 12 having a series of slots 13 outlined by abutments 14 and a hole 15 forming a bearing for the pivot shaft 16 relatively to which the portions 10 and 11 articulate or pivot.

The load supporting portion 11 terminates in a vertical plate member 17 which supports a series of bolts 18 protruding from abutments 19, and adapted to operate in the slots 13 of the vertical plate 12. The vertical plate 17 also supports pivot shaft 16, which functions to hold the plates 12 and 17 for pivoting movement relatively to one another, as is best illustrated in Fig. 9, the shaft 16 being threaded at 20 to support the nut member 21 for maintaining the parts properly positioned. A lubricating nipple 22 is utilized for lubricating this bolt in the usual manner well known in the art.

In Fig. 10, the coaction of one of the bolts 18 with the parts 17 and 12 is also illustrated more in detail. It will be noted that the bolt 18 is threaded as at 23 for coaction with a nut 24. The abutments 14 and 19 of the plates 12 and 17 preferably prevent frictional contact between the plates 12 and 17, the abutments acting as the rubbing and guiding surfaces.

In Figs. 3–7, the location of the pivot shaft 16 relatively to the truck is best indicated. It will be seen that this pivot shaft is placed at the lowermost possible position relatively to the plate members 12 and 17 and substantially in the same plane as the axis on which the load supporting wheels 25 rotate. While the shaft may be placed elsewhere, I have found this to be the best location.

The load supporting wheels 25 are carried on axles, in turn supported by pivot shafts mounted on ears 26 of the abutments 27, shown best in Fig. 7. By this construction, the load wheels are fixedly carried by the load supporting portion, in so far as relative vertical movement is concerned, the wheels being, of course, pivotal in the usual manner well known in the art, should it be desirable to steer through these wheels.

The articulating or rotating movement between the vertical plates 12 and 17 is probably best illustrated in Figs. 2–6, inclusive. It will be noted that the pivoting or articulating movement is limited by the length of the slots 13, this movement being calibrated to the proper amount generally required in commercial trucks. The stability of a truck utilizing this construction is easily appreciated. The load portion is supported by two load supporting wheels which accommodate themselves to any terrain. The load platform pivots easily and as a whole relatively to the shaft 16, thus allowing the accommodation of the wheels to the terrain while exerting no strain whatsoever on the frame of the truck. Similarly, the movement of the load supporting portion does not effect the position of the drive wheels nor does it affect the tractive effort of the said wheels.

As I have already indicated, I have illustrated my invention as applied to a truck of the tilting fork type. I shall now describe generally the mounting of the tilting forks on the truck, it being understood that the detailed construction of the tilting forks and their operation is thoroughly covered in my application supra.

A pair of uprights 30 have formed thereon horizontal portions 31 equipped with rollers 32 and 33 (Fig. 1), the rollers 32 cooperating with guide tracks 34, while the rollers 33 cooperate with guide tracks 35. Through a rack bar 36 cooperating with electrically driven pinion mechanism 37, the uprights 30 may be tilted about the rollers 33, or may be moved forwardly and rearwardly on the tracks 34 and 35 through the cooperation of the rollers 32 and 33, as may be desired. The uprights 30 carry a load platform 38 having forks 39, which platform 38 moves vertically on the uprights 30 through rollers 40, as will be readily appreciated.

For elevating the platform 38, I use an electrically operated means 41 which operates through a chain 42 (Fig. 2) to elevate and lower the platform in the usual manner well known in the art. It will be readily appreciated that because the rear driving portion 10 of the truck articulates relatively to the load supporting portion 11, it is necessary that the controls for the electrically driven pinion mechanism 37 and lifting mechanism 41 be of a special nature. I have provided rather unique connections between control levers 43 and 44, the rods 45 and 46, and the mechanisms 37 and 41, all of which are covered in my application supra.

I now claim:

1. In a lift truck of the class described, a load supporting portion terminating in a substantially vertical plate, a driving portion terminating also in a substantially vertical plate, means for securing said load and driving portions with said plates back to back whereby to form a completed truck, said means being arranged to permit sliding of said plates relatively to one another.

2. In a lift truck of the class described, a load supporting portion terminating in a substantially vertical plate, a driving portion terminating also in a substantially vertical plate, means for securing said load and driving portions with said plates back to back whereby to form a completed truck, a pivot shaft forming part of said securing means, said pivot shaft being adapted to form an axis about which said plates may rotate relatively to one another.

3. In a lift truck of the class described, a load supporting portion terminating in a substantially vertical plate, a driving portion terminating also in a substantially vertical plate, means for securing said load and driving portions with said plates back to back whereby to form a completed truck, said means including a bolt moving in an arc shaped slot and adapted to permit sliding of said plates relatively to one another while controlling and guiding said sliding movement.

4. In a lift truck of the class described, a load supporting portion terminating in a substantially vertical plate, a driving portion terminating also in a substantially vertical plate, means for securing said load and driving portions with said plates back to back whereby to form a completed truck, said means comprising a pivot shaft located substantially at the lowest point in each of said plates and about which said plates may rotate relatively to one another to permit articulating of the truck on a horizontal axis, and bolt and slot means located above said axis for limiting said rotation and for maintaining said plates in assembled relation.

CHARLES S. SCHROEDER.